United States Patent
Shao et al.

(10) Patent No.: US 10,774,722 B2
(45) Date of Patent: Sep. 15, 2020

(54) PREDICTIVE METHODS FOR EMISSIONS CONTROL SYSTEMS PERFORMANCE

(71) Applicant: Afton Chemical Corporation, Richmond, VA (US)

(72) Inventors: Huifang Shao, Midlothian, VA (US); Joseph W. Roos, Mechanicsville, VA (US); Joseph E. Remias, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 189 days.

(21) Appl. No.: 16/121,225

(22) Filed: Sep. 4, 2018

(65) Prior Publication Data

US 2020/0072112 A1   Mar. 5, 2020

(51) Int. Cl.
| | | |
|---|---|---|
| *G01M 15/10* | (2006.01) |
| *F01N 11/00* | (2006.01) |
| *F01N 9/00* | (2006.01) |
| *B01D 46/00* | (2006.01) |
| *B01D 46/44* | (2006.01) |

(52) U.S. Cl.
CPC .......... *F01N 11/00* (2013.01); *B01D 46/0086* (2013.01); *B01D 46/442* (2013.01); *B01D 46/448* (2013.01); *F01N 9/002* (2013.01); *B01D 2279/30* (2013.01); *F01N 2550/04* (2013.01); *F01N 2550/20* (2013.01); *F01N 2900/1606* (2013.01)

(58) Field of Classification Search
CPC ..... B01D 46/0086; F01N 9/002; F01N 11/00; F01N 11/002; F01N 2550/04; F01N 2900/1606
USPC ......................................... 73/114.69, 114.75
See application file for complete search history.

(56) References Cited

U.S. PATENT DOCUMENTS

| | | | |
|---|---|---|---|
| 2,425,755 A | 8/1947 | Roberts et al. |
| 2,425,845 A | 8/1947 | Toussaint et al. |
| 2,448,664 A | 9/1948 | Fife et al. |
| 2,457,139 A | 9/1948 | Fife et al. |
| 3,438,757 A | 4/1969 | Honnen et al. |
| 3,454,555 A | 7/1969 | Van Der Voort et al. |
| 3,485,601 A | 12/1969 | Mehmedbasich |
| 3,565,804 A | 2/1971 | Honnen et al. |
| 3,573,010 A | 3/1971 | Mehmedbasich |
| 3,574,576 A | 4/1971 | Honnen et al. |

(Continued)

FOREIGN PATENT DOCUMENTS

| | | |
|---|---|---|
| EP | 0384086 A1 | 8/1990 |
| EP | 1657291 A1 | 5/2006 |

OTHER PUBLICATIONS

Environmental Protection Agency, Part IV, Rules and Regulations, Federal Register, vol. 71, No. 10, Jan. 17, 2006, pp. 2810-2842.

(Continued)

*Primary Examiner* — Eric S. McCall
(74) *Attorney, Agent, or Firm* — Honigman LLP

(57) ABSTRACT

Particulate filters are used to remove particulate matter such as soot and ash in the emissions control systems of vehicles, including gasoline direct injection (GDI) engines. Methods are provided to predict the long-term performance and durability of emissions control systems having particulate filters. The methods account for factors such as thermal aging, soot accumulation and regeneration, and ash loading.

11 Claims, 7 Drawing Sheets

(56) References Cited

U.S. PATENT DOCUMENTS

| | | | |
|---|---|---|---|
| 3,671,511 | A | 6/1972 | Honnen et al. |
| 3,746,520 | A | 7/1973 | Mehmedbasich |
| 3,756,793 | A | 9/1973 | Robinson |
| 3,763,244 | A | 10/1973 | Shubkin |
| 3,780,128 | A | 12/1973 | Shubkin |
| 3,844,958 | A | 10/1974 | Anderson et al. |
| 3,849,085 | A | 11/1974 | Kruez et al. |
| 3,852,258 | A | 12/1974 | Flay |
| 3,864,098 | A | 2/1975 | Honnen |
| 3,876,704 | A | 4/1975 | Nakaguchi |
| 3,884,647 | A | 5/1975 | Nakaguchi |
| 3,898,056 | A | 8/1975 | Honnen |
| 3,950,426 | A | 4/1976 | Culbertson |
| 3,960,515 | A | 6/1976 | Honnen |
| 4,022,589 | A | 5/1977 | Alquist et al. |
| 4,039,300 | A | 8/1977 | Chloupek et al. |
| 4,128,403 | A | 12/1978 | Honnen |
| 4,152,499 | A | 5/1979 | Boerzel et al. |
| 4,166,726 | A | 9/1979 | Harle |
| 4,168,242 | A | 9/1979 | Soula |
| 4,172,855 | A | 10/1979 | Gluckstein et al. |
| 4,191,537 | A | 3/1980 | Honnen et al. |
| 4,218,330 | A | 8/1980 | Shubkin |
| 4,231,759 | A | 11/1980 | Udelhofen et al. |
| 4,236,020 | A | 11/1980 | Lewis et al. |
| 4,238,628 | A | 12/1980 | Cahill et al. |
| 4,288,612 | A | 9/1981 | Lewis et al. |
| 4,361,028 | A * | 11/1982 | Kamiya ............... G01N 1/2252 73/23.33 |
| 4,605,808 | A | 8/1986 | Samson |
| 4,747,297 | A * | 5/1988 | Okayama ........... G01N 33/0032 73/23.33 |
| 4,877,416 | A | 10/1989 | Campbell |
| 4,950,822 | A | 8/1990 | Dileo et al. |
| 5,034,471 | A | 7/1991 | Blackborrow |
| 5,086,115 | A | 2/1992 | Clarke |
| 5,089,029 | A | 2/1992 | Hashimoto et al. |
| 5,112,364 | A | 5/1992 | Rath et al. |
| 5,124,484 | A | 6/1992 | Brown et al. |
| 5,196,170 | A * | 3/1993 | Patashnick ......... G01N 15/0618 110/217 |
| 5,300,701 | A | 4/1994 | Cherpeck |
| 5,322,529 | A | 6/1994 | Buckley, III |
| 5,514,190 | A | 5/1996 | Cunningham et al. |
| 5,522,906 | A | 6/1996 | Hashimoto et al. |
| 5,634,951 | A | 6/1997 | Colucci et al. |
| 5,697,988 | A | 12/1997 | Malfer et al. |
| 5,725,612 | A | 3/1998 | Malfer et al. |
| 5,755,835 | A | 5/1998 | Cherpeck |
| 5,814,111 | A | 9/1998 | Graham et al. |
| 5,873,917 | A | 2/1999 | Daly |
| 5,876,468 | A | 3/1999 | Moreton |
| 6,048,373 | A | 4/2000 | Malfer et al. |
| 10,029,246 | B1 * | 7/2018 | Dixon ..................... C11D 7/44 |
| 2001/0029775 | A1 * | 10/2001 | Uchihara ........... G01N 15/0618 73/28.01 |
| 2004/0226354 | A1 * | 11/2004 | Schmidt ............. G01N 33/0018 73/114.73 |
| 2005/0247105 | A1 * | 11/2005 | Dikken .................. B01D 69/10 73/28.04 |
| 2009/0019831 | A1 * | 1/2009 | Heibel .................... F01N 3/035 60/274 |
| 2016/0123201 | A1 | 5/2016 | Silver |
| 2016/0363019 | A1 | 12/2016 | Warner et al. |
| 2018/0017012 | A1 | 1/2018 | Suchta et al. |
| 2019/0292959 | A1 * | 9/2019 | Dudar ................. F02D 41/0055 |

OTHER PUBLICATIONS

Campen et al., Growing use of synlubes, Special Report: Lubes for the Future, Hydrocarbon Processing, vol. 61, No. 2, Feb. 1982, pp. 75-82.

Newton, Propylene Oxide Polymers and Higher 1,2-Epoxide Polymers, Kirk-Othmer Encyclopedia of Chemical Technology, Third Edition, 1982, pp. 633-645, vol. 18, John Wiley & Sons.

Gasoline Particulate Filter (GPF) How can the GPF cut emissions of ultrafine particles from gasoline engines?, AECC, Nov. 2017, pp. 1-10.

* cited by examiner

PREDICTIVE METHODS FOR EMISSIONS CONTROL SYSTEMS PERFORMANCE

TECHNICAL FIELD

The disclosure relates to emissions control systems of vehicles equipped with particulate filters.

BACKGROUND

While conventional port fuel injection (PFI) gasoline engines have extremely low particulate emissions, newer gasoline direct injection (GDI) engines have particulate emissions comparable to diesel engines. Gasoline particulate filters (GPFs) have been introduced to the automotive market for the emissions control systems for GDI engines to reduce particulate emissions. Particulate filters need to filter efficiently for a specified durability performance for an in-service lifetime, which can exceed 150,000 miles.

A critical challenge in adopting gasoline particulate filters for GDI applications is predicting GPF durability and long-term performance. Unfortunately, methods to determine particulate filter durability and long-term performance are lacking. Historically, accelerated aging methods have been developed in stoichiometric engines to verify on-road durability performance. Accelerated aging methods are used primarily because on-road durability testing is very time consuming and extremely expensive. There is a need for accelerated aging techniques to predict the long-term performance of emissions control systems having particulate filters in a fast and cost-effective manner.

BRIEF DESCRIPTION

As set forth above, the present disclosure relates to methods of predicting the performance of vehicle emissions control systems comprising particulate filters over an in-service lifetime.

In a first aspect, the methods of predicting performance of an emissions control system are disclosed herein. In some examples, the methods comprise conducting an aging test comprising operating an engine through an aging profile, wherein the engine is operated for an aging time and at an aging temperature; and measuring the weight gain of the particulate filter after the aging test. In some examples, the aging profile comprises multiple cycles and each cycle comprises a first mode operated for a first time ($t_1$), a second mode operated for a second time ($t_2$), and a third mode operated for loading third time ($t_3$). In some examples, each of $t_1$, $t_2$, and $t_3$ is about 0.25 hours to about 2 hours. In some examples, at least one mode is performed using a doped fuel. In some examples, the thermal aging mode and the ash loading mode are performed using a doped fuel and the soot loading mode is performed using a non-doped fuel.

In some examples, the methods further comprise calculating the predicted total ash loading ($AL_{total}$) using an ash loading equation:

$$AL_{total} = FC_{total} * m\% * CR\%$$

wherein m % is a weight percent of a dopant in a fuel, and CR % is a percent ash collection rate in the emissions control system.

In some examples, the aging time and the aging temperature are determined by conducting a road cycle comprising driving a test vehicle wherein the emissions control system is equipped with a particulate filter for a road cycle time, wherein the particulate filter comprises a filter inlet and a filter bed; collecting a plurality of measurements of a filter inlet temperature versus road cycle time and of a filter bed temperature versus road cycle time; and selecting the aging time and selecting the aging temperature to achieve a thermal aging target. In some examples, the methods further comprise generating an engine map based on the plurality of measurements.

In some examples, the road cycle time is less than about 2 hours. In some examples, the aging time is less than about 300 hours.

In some examples, the emissions control system comprises a particulate filter and at least one of a selective reduction catalyst (SCR), a lean NOx trap (LNT), a catalytic converter, and a muffler.

In some examples, a subset of the multiple cycles comprises a soot regeneration mode. In some examples, the soot regeneration mode has a duration of about 5 minutes to about 30 minutes at intervals of about 10 hours to about 20 hours during the aging time.

In some examples, the soot regeneration mode is performed using a non-doped fuel.

In a second aspect, methods of predicting performance of an emissions control system over an in-service lifetime comprise conducting an aging test comprising operating an engine through an aging profile, wherein the aging profile comprises multiple cycles and wherein each cycle comprises a first mode operated for a first time ($t_1$), a second mode operated for a second time ($t_2$), and a third mode operated for loading third time ($t_3$). In some examples, a subset of the cycles further comprises a soot regeneration mode.

In a third aspect, methods of predicting total ash loading ($AL_{total}$) of a particulate filter over an in-service lifetime comprise conducting an aging test comprising operating an engine through an aging profile, wherein the aging profile comprises multiple cycles and wherein each cycle comprises a thermal aging mode, a soot loading mode, and an ash loading mode, and wherein the engine is operated for an aging time and at an aging temperature; collecting fuel consumption data of a fuel during the aging test; calculating total fuel consumption ($FC_{total}$) using a fuel consumption equation:

$$FC_{total} = \Sigma_{min}^{max} n(t_i * FC_i),$$

wherein $FC_i$ are measurements of fuel consumption collected during each successive mode, and $t_i$ is a time of each mode, respectively; and n is a number of cycles; and calculating a predicted total ash loading ($AL_{total}$) using an ash loading equation:

$$AL_{total} = FC_{total} * m\% * CR\%$$

wherein m % is a weight percent of a dopant in the fuel, and CR % is a weight percent of ash present in the particulate filter after the aging test.

In some examples, the aging time and the aging temperature are determined by conducting a road cycle comprising driving a test vehicle equipped with the particulate filter for a road cycle time, wherein the particulate filter comprises a filter inlet and a filter bed; collecting a plurality of measurements of filter inlet temperature versus road cycle time and of a filter bed temperature versus road cycle time; selecting aging test conditions by determining a total aging time needed to achieve a thermal aging target based on a plurality of measurements; and selecting the aging temperature and selecting the aging time and selecting the aging temperature to achieve a thermal aging target. In some examples, a subset of the cycles further comprises a soot regeneration mode.

In a fourth aspect, methods of predicting particulate filter performance over an in-service lifetime comprise conducting a road cycle comprising driving a test vehicle equipped with a particulate filter for a road cycle time, wherein the particulate filter comprises a filter inlet and a filter bed; collecting a plurality of measurements of filter inlet temperature versus road cycle time and of a filter bed temperature versus road cycle time; selecting aging test conditions by determining a total aging time needed to achieve a thermal aging target based on a plurality of measurements; selecting an aging temperature and selecting an aging time at the aging temperature to achieve a thermal aging target; and calculating a predicted total ash loading ($AL_{total}$) over the in-service lifetime of the particulate filter.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

LISTING OF THE FIGURES

DETAILED DESCRIPTION

Figure 1:
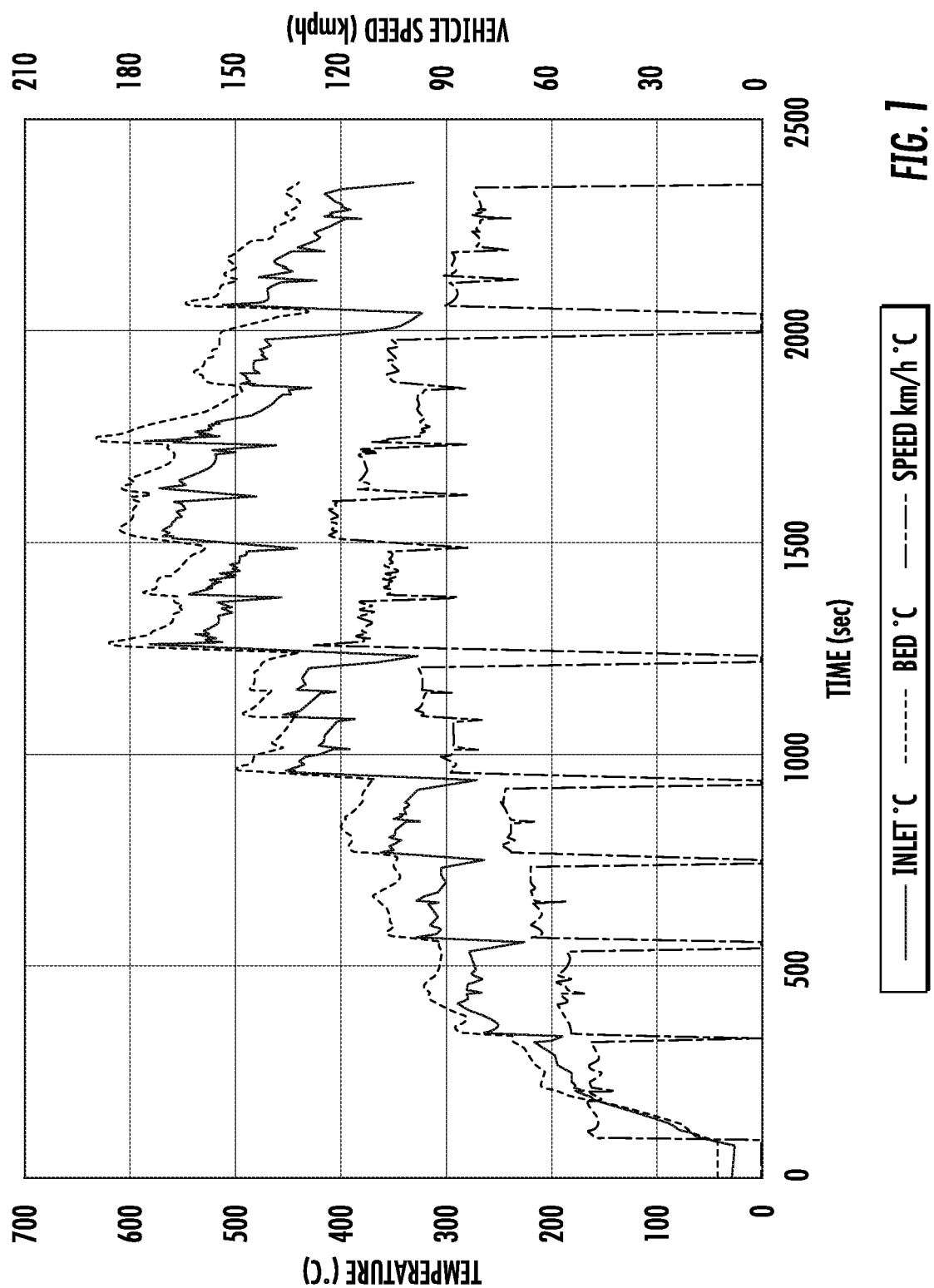
FIG. 1 is a graph of vehicle speed and temperature vs. time in a road cycle test.

Methods of predicting performance of an emissions control system over an in-service lifetime are disclosed herein. An emissions control system reduces or eliminates the number or type of compounds in the exhaust effluent of an internal combustion engine. For example, soot and ash emissions may be reduced, and nitrogen oxide and carbon monoxide may be converted to nitrogen and carbon dioxide, respectively. Typical components of an emissions control system are a particulate filter, a catalytic converter, a selective reduction catalyst (SCR), a lean NOx trap (LNT), and a muffler. The methods described herein are useful for predicting the performance of emissions control systems for gasoline and diesel engines.

Although the methods disclosed herein may be applied to any emissions control systems having a particulate filter, in particular, the methods may be applied to predict long-term GPF performance. Accelerated aging methods simulate the total thermal load and soot/ash accumulation over the full useful life of the particulate filter, and can be practiced with standard equipment, such as a mounted engine, in what is termed a bench test. The in-service lifetime is the specification for how long an automotive component should function properly, and is typically about 150,000 miles. The methods include accelerated aging methods using conventional equipment to account for thermal aging, soot accumulation/regeneration, and ash loading, which result in end-of-life performance. Post-mortem analysis of the filter (e.g., weight gained during the test) can be performed at the end of the testing. Additionally, in cases where a dopant is present in the fuel during the tests, ash loading may be predicted using the equations disclosed herein. The methods are useful as certification tests to demonstrate the durability performance of the emissions control system in general, and of the particulate filter in particular.

Accelerated aging tests have been developed to provide a reliable method of predicting emissions controls system performance for the full useful life of the vehicle. See, for example, 40 CFR Part 86, commonly referred to as "CAP 2000", which is incorporated by reference in its entirety. An accelerated aging test is more practical to run, as a bench aging test time is typically in the hundreds of hours, as opposed to a road test driving wherein a vehicle is driven for about 150,000 miles. However, the methods described herein could also be used to predict long-term performance over a shorter mileage in a road cycle test. In some examples, "long term" refers to about 150,000 miles. In other examples, long term can be about 50,000 miles, about 60,000 miles, about 70,000 miles, about 80,000 miles, about 100,000 miles, about 150,000 miles, about 175,000 miles, or about 200,000 miles.

In some examples, methods of predicting performance of an emissions control system over an in-service lifetime include conducting an aging test that includes operating an engine through an aging profile, wherein the engine is operated for an aging time and at an aging temperature; collecting fuel consumption data of a fuel during the aging test, and measuring the weight gain of the particulate filter after the aging test. Weight gain is due to ash build-up in the filter, so predicted ash loading can be expressed as ($weight_{final}$–$weight_{initial}$). In some examples, the methods further include calculating a predicted total ash loading ($AL_{total}$) over the in-service lifetime of the emissions control system.

Any accelerated aging test relies on the principle of creating an equivalent thermal load to the load the emissions control system would bear over the full time period, if the full period were run. A thermal aging target specifies a temperature at which the accelerated aging test should be run for the desired shortened amount of time, or the time at which the accelerated aging test should be run for the desired temperature of the test. For example, if the desired time for the accelerated aging test is 100 hours, the methods described herein can be used to determine the temperature to create an equivalent thermal load in that amount of time.

In order to determine the thermal aging target, any road cycle (e.g., a standard road cycle (SRC)) is conducted for a short period of time, such as no more than about 20 minutes, about 30 minutes, about 40 minutes, about 50 minutes, about 1 hour, about 2 hours, about 3 hours, about 4 hours, about 5 hours, about 10 hours, or about 20 hours. A road cycle specifies cycles of time of road driving including one or more modes, where each mode has a particular engine torque/load and speed. In some examples, the road cycle time is less than about 2 hours. In other examples, the road cycle time is less than about 1.5 hours or less than 1 hour. In some examples, the road cycle time is from about 0.5 hours to about 2 hours.

During the road cycle, at least two temperature measurements are obtained: the inlet temperature to the emissions control system, and the bed temperature of the catalyst bed in the catalytic converter. An exemplary plot of temperature data collected during a road cycle is shown in FIG. 1. These temperatures are used in the Bench Aging Time (BAT) equation 1 to calculate the total aging time needed to achieve the thermal aging target.

$$BAT = A * \sum_{min}^{max} t_h \left( e^{\frac{R}{T_r} - \frac{R}{T_v}} \right) \quad (1)$$

Where:
A=Deterioration source adjustment
R=Catalyst thermal reactivity coefficient.
$t_h$=the time measured within the prescribed temperature bin of the vehicles catalyst temperature histogram adjusted to a full useful life basis.
$T_r$=The effective reference temperature (in Kelvin, K) of the catalyst on the catalyst bench run on the bench aging cycle.
$T_v$=The mid-point temperature (in Kelvin, K) of the temperature bin of the vehicle on-road catalyst temperature histogram.

Deterioration source adjustment refers to the factor accounting for deterioration from sources other than thermal aging of the catalyst. Temperature bin refers to a temperature interval that is no greater than 25° C. for vehicle on-road data, and no greater than 10° C. for bench data. The catalyst thermal reactivity coefficient is inherent in the catalyst used in catalytic converter.

Histograms of temperature versus time generated from the temperature data may be used in the BAT equation to generate an Arrhenius plot. The Arrhenius plot is then used to determine at what aging temperature the bench test should be conducted for a desired amount of time to provide an equivalent thermal load. While the Arrhenius plot is traditionally created using emissions control system inlet and catalyst bed temperatures, in the instant application it is desired to subject the particulate filter to accelerated aging conditions, so the temperatures are measured at the emissions control system inlet and at the lateral midpoint of the catalytic converter's catalyst bed. For example, for a 12 inch long cylindrical catalyst bed, the lateral midpoint is along the cylinder axis, two inches from the inlet. The terms "bench aging time" and "aging time" are synonymous; the terms "bench aging temperature" and "aging temperature" are synonymous as the aging time may be accomplished via bench testing or road testing.

Figure 2:
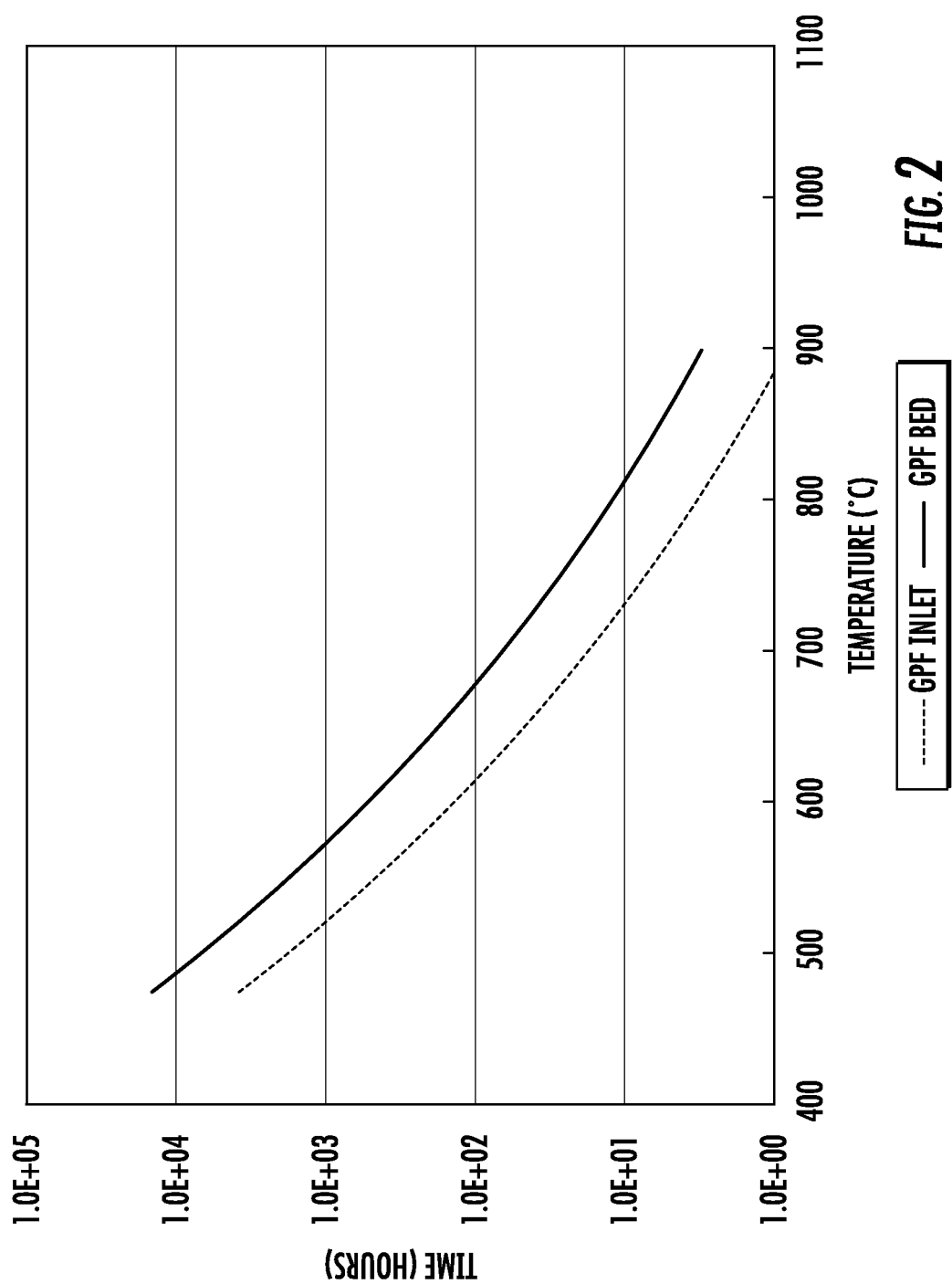
FIG. 2 is an Arrhenius plot.
Figure 3:
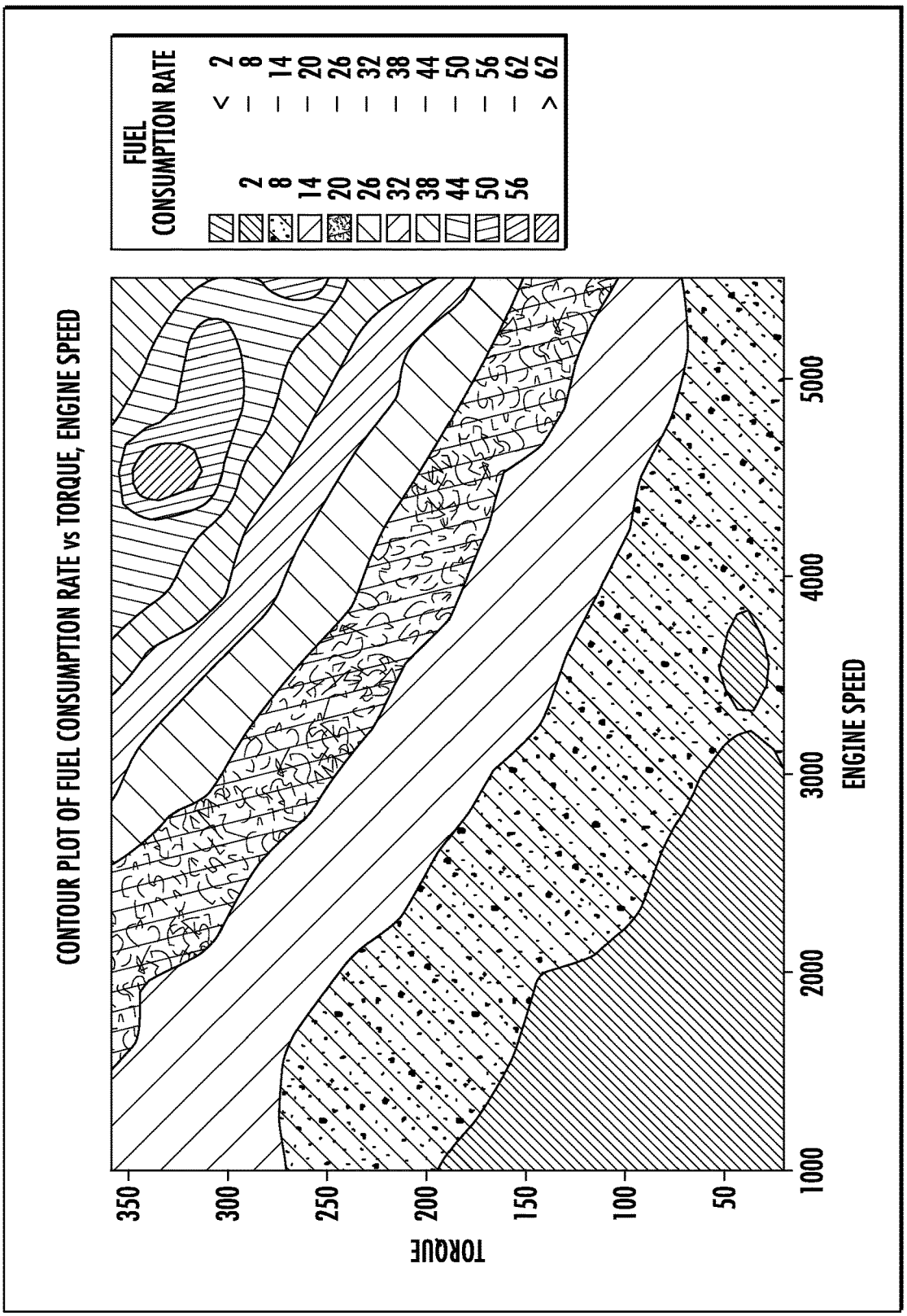
FIG. 3 is a contour plot of fuel consumption at varying engine speed and torque.
Figure 4:
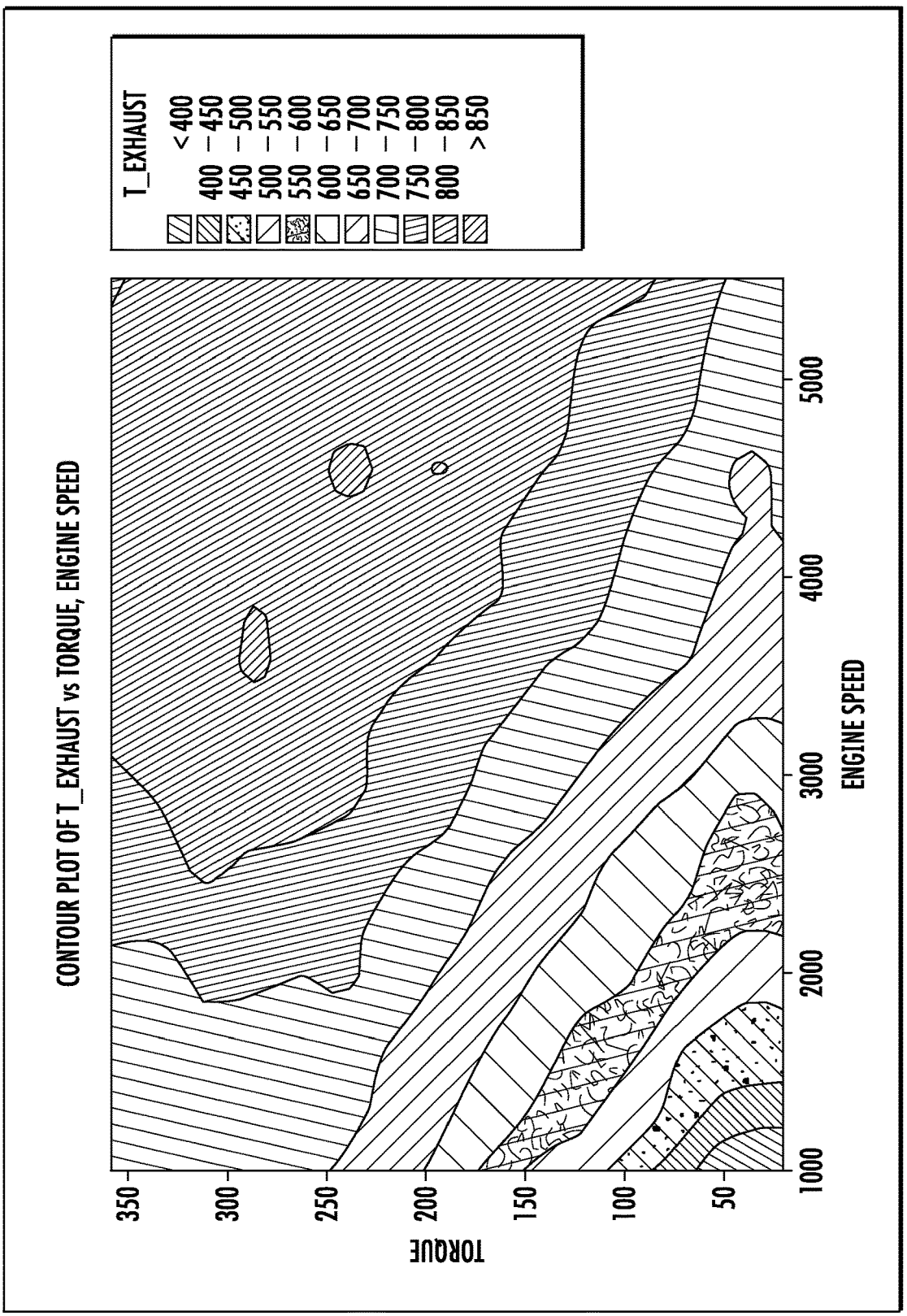
FIG. 4 is a contour plot of exhaust temperature ($T_e$) at varying engine speed and torque.
Figure 5:
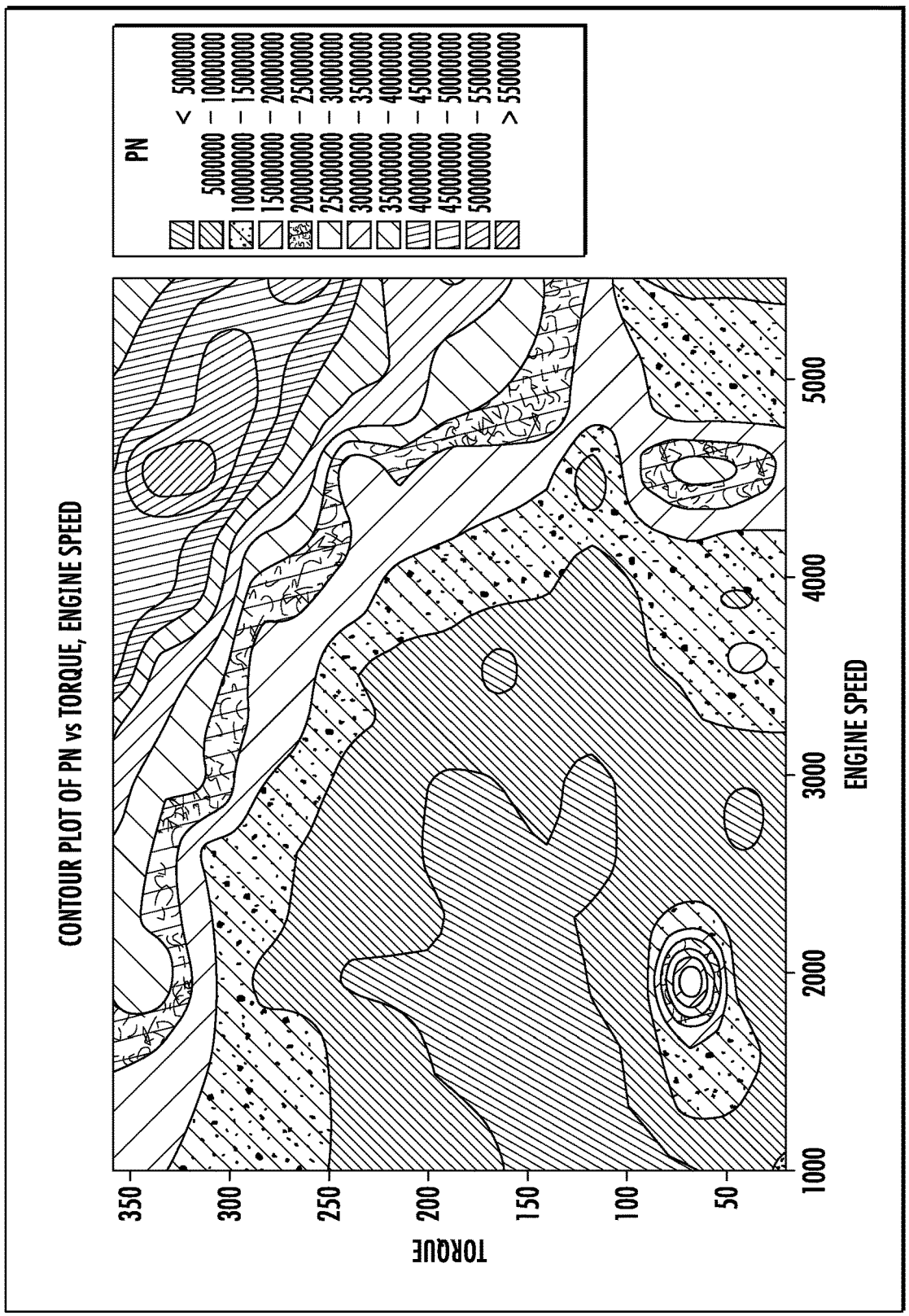
FIG. 5 is a contour plot of particle number counts at varying engine speed and torque.
Figure 6:
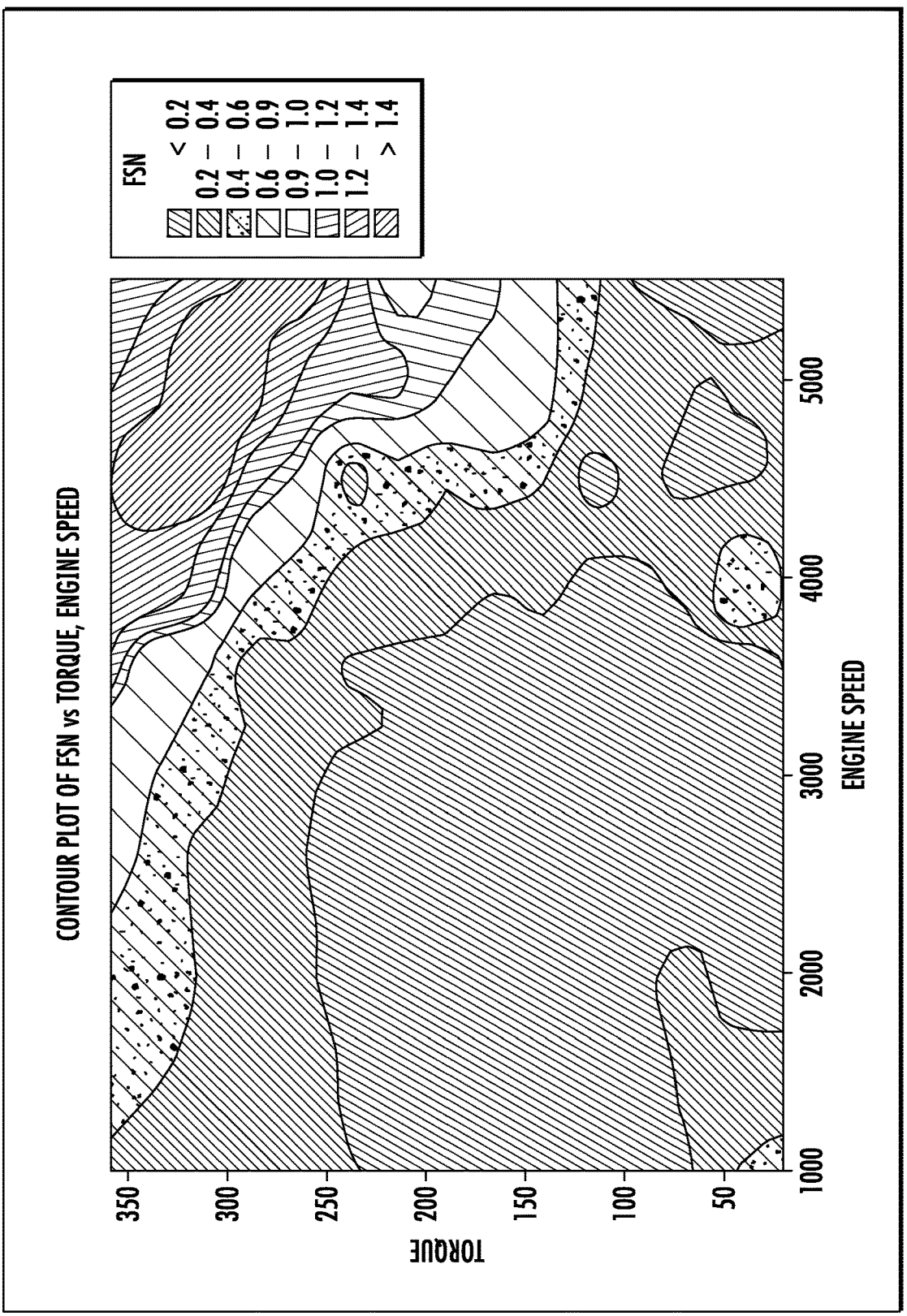
FIG. 6 is a contour plot of filter smoke number (FSN) at varying engine speeds and torques.

When referring to the Arrhenius plot, the time-temperature coordinates selected must be above the plot line for inlet temperature or bed temperature. An exemplary Arrhenius plot is shown in FIG. 2. As an illustration, if the preferred aging time is 100 hours as found on the y-axis, the aging temperature must be greater than about 610° C. by particulate filter inlet temperature to be above the lower curve, or greater than about 680° C. by particulate filter bed temperature to be above the upper curve. Either plot line may be used, as long as the corresponding temperature (filter inlet temperature or inlet bed temperature) is monitored during the aging test. In some cases, an aging time may be selected, and the Arrhenius equation used to determine the corresponding aging temperature to achieve the thermal aging target. Alternately, an aging temperature may be selected, and the Arrhenius equation used to determine the corresponding aging time to achieve the thermal aging target. Although the Arrhenius equation is often used, any other method of determining aging time and aging temperature known in the art to achieve the thermal aging target may be used.

In some examples, the methods further include generating an engine map based on the plurality of measurements taken during the road cycle. The data in the engine map may be presented as a contour plot. For examples, FIGS. 3-6 depict engine maps of fuel consumption rate, exhaust temperature, particle number, and filter smoke number (FSN) vs. torque and engine speed, respectively. Engine mapping is conducted changing engine speed and load in a stepwise fashion (e.g., starting from a low engine speed, the load is increased from low to high (or from high to low) by a certain percentage, which can be 5%, or 10%, or 15%, or 20%, or 25%, or 30%, and then the engine speed is raised to the next level, with the same pattern of increasing (or decreasing) load).

The accelerated aging test follows an aging profile, which is a map of multiple engine modes under specified engine speed and torque/load, and in some cases additional specifications, such as fuel doping. One helpful but non-limiting aging profile is the four-mode accelerated aging profile shown in Table 1. In some cases, a mode may contribute to more than one of thermal aging, ash load, and soot loading. The number of plus signs for each factor in the table indicates the relative importance of that factor to the contribution to the aging profile for each contribution specified in the rightmost column, with + indicating minimal impact, ++ indicating moderate impact, and +++ indicating high impact. Further, for engine speed and load, + indicates low, ++ indicates medium, and +++ indicates high engine speed and/or load. A person of ordinary skill will understand that specific engine speed and load are dependent on the size and type of engine (e.g., what is considered low speed may vary from engine to engine). In cases where modes are conducted at different temperatures and/or different times, the aggregate data (i.e., the summation of points of time and temperature data) must equal the targeted aging time and aging temperature.

TABLE 1

Technical requirements of four-mode accelerated aging profile

| Mode | Engine speed | Load | Oil doping | Fuel consumption | Temperature | Soot production | Contribution |
|---|---|---|---|---|---|---|---|
| 1 | +++ | ++ | Yes | ++ | ++ | + | Ash loading Thermal aging |
| 2 | ++ | +++ | Yes | ++ | +++ | + | Thermal aging Ash loading |
| 3 | + | + | No | + | + | ++ | Soot loading Engine maintenance |
| 4 | ++ | ++ | No | ++ | ++ | + | Soot regeneration |

Figure 7:
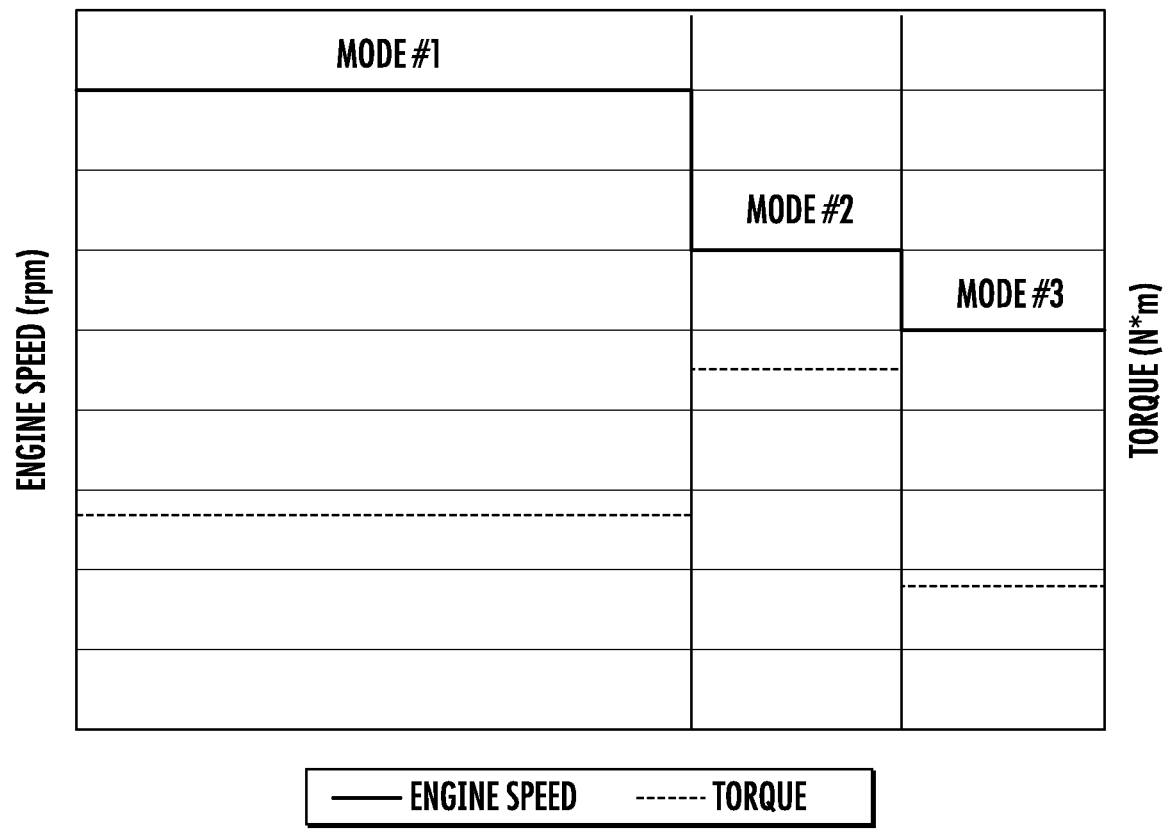
FIG. 7 is an exemplary aging profile for bench aging tests.

The aging profile can be conducted with different combinations of engine operation, system and time, as long as contributions are made to thermal aging, ash loading, and soot loading. Whether the profile utilizes repeated cycles or overall operation to achieve accelerated aging, the aging profile must include a thermal aging time characterizing thermal load to the emissions control system, a soot loading time characterizing accumulating soot to the emissions control system, and an ash loading time characterizing loading ash to the emissions control. Each characteristic time represents the overall time for each mode of aging, which is determined by appropriately weighting the operation under different conditions within the respective mode. An exemplary aging profile is shown in FIG. 7, and is discussed further in the Examples section.

In some examples, only modes 1-3 are conducted. In some examples, modes are conducted in a sequence (e.g., 1,2,3; 1,2,3; etc.). One repeat of the modes may also be referred to as a cycle (e.g., 1,2,3 is "a cycle", and 1,2,3; 1,2,3; 1,2,3; 1,2,3 is four cycles). In some examples, a cycle further includes a fourth mode that is a soot regeneration mode. The soot regeneration mode may be present in only a subset of the cycles. In some examples, the fourth mode is added after a certain number of repeats of modes 1-3 (e.g., 1,2,3; 1,2,3; 1,2,3,4; 1,2,3; 1,2,3; 1,2,3,4; etc.). While in this case these exemplary modes are labeled numerically for clarity, they can also be identified by labeling the primary function of the mode. Thus, in this case, mode 1 is the ash loading mode; mode 2 is the thermal aging mode; mode 3 is the ash loading mode; and mode 4 is the soot regeneration mode. A cycle may include the modes in any order, and a sequence may have any number of cycles.

In some examples, the soot regeneration mode has a duration of about 5 minutes to about 30 minutes at intervals of about 10 hours to about 20 hours during the aging time. Alternately, the soot generation mode has a duration of about 10 minutes to about 30 minutes, about 5 minutes to about 15 minutes, or about 15 minutes to about 30 minutes, and is conducted at intervals of about 12 hours to about 18 hours, about 10 hours to about 15 hours, or about 15 hours to about 20 hours.

In some examples, the aging profile includes multiple cycles and wherein each cycle includes a thermal aging mode operated for a thermal aging time ($t_{TA}$), a soot loading mode operated for a soot loading time ($t_{SL}$), and an ash loading mode operated for an ash loading time ($t_{AL}$). In some examples, each of $t_{TA}$, $t_{SL}$, and $t_{AL}$ is about 0.25 hours to about 2 hours, about 0.5 hours to about 1.75 hours, or about 0.75 hours to about 1.75 hours. Ideally, the total accelerated aging profile can be conducted in less that about 500 hours of engine time. In some examples, the accelerated aging profile can be conducted in less that about 400 hours, less that about 300 hours, less that about 200 hours, less that about 100 hours, less than about 75, or less that about 50 hours of engine time. In some cases, the aging time is from about 50 hours to about 300 hours, from about 75 hours to about 275 hours, from about 100 hours to about 250 hours, or from about 100 hours to about 200 hours.

Fuel consumption may be monitored continuously through the aging profile. In some examples, a fuel dopant may be used to produce ash and soot at a greater rate than by fuel combustion alone. When a dopant is present, performance prediction includes post-mortem examination of the particulate filter and calculating predicted ash loading using the ash loading equation provided and post-mortem examination of the particulate filter, for example, weighing the filter at the end of the test to determine weight increase due to ash loading. In other examples, only non-doped fuel is used, and performance prediction includes post-mortem examination of the particulate filter.

In some examples, the dopant is a fuel additive. As used herein, "fuel additive" may refer to a conventional fuel additive, and also may refer to a non-conventional fuel additive, additive package, or composition that ordinarily would not be added to fuel. One non-limiting example of a non-conventional fuel additive of this disclosure is a lubricant composition having a base oil and one or more additives that are traditionally used in lubricant formulations. In some cases, the dopant composition includes a conventional fuel additive. In some examples, the dopant includes a fuel additive such as methylcyclopentadienyl manganese tricarbonyl (MMT) or ferrocene. In some example, the dopant includes a lubricant formulation (i.e., a formulated engine oil). A person of ordinary skill will understand that any additive that contributes to soot or ash production may be used. In some examples, the thermal aging mode and the ash loading mode are performed using a doped fuel and wherein the soot loading mode is performed using a non-doped fuel.

Equations for predicting the ash loading of the particulate filter after the in-service lifetime using data collected during an accelerated aging profiles are disclosed herein. Calculating the predicted total ash loading includes first calculating total fuel consumption ($FC_{total}$) using a fuel consumption equation:

$$FC_{total} = \Sigma_{min}^{max} n(t_i * FC_i),$$

wherein $FC_i$ are measurements of fuel consumption collected during each successive mode, $t_i$ is a time of each mode, and n is a number of cycles; and then calculating the predicted total ash loading ($AL_{total}$) using an ash loading equation:

$$AL_{total} = FC_{total} * m\% * CR\%$$

wherein m % is a weight percent of a dopant in a fuel, and CR % is a percent ash collection rate in the emissions control system. Percent ash collection rate in the emissions control system refers to the amount of ash collected in the particulate filter divided by the total ash produced by the combustion of the fuel, expressed as a percentage.

In some examples, methods of predicting total ash loading ($AL_{total}$) of a particulate filter over an in-service lifetime include conducting an aging test that includes operating an engine through an aging profile, wherein the aging profile has multiple cycles and wherein each cycle includes a first mode, a second mode, and a third mode, and wherein the engine is operated for an aging time and at an aging temperature; collecting fuel consumption data of a fuel during the aging test; calculating the total fuel consumption ($FC_{total}$) and calculating a predicted total ash loading ($AL_{total}$) using equations presented above.

In some examples, the methods of predicting particulate filter performance over an in-service lifetime include conducting a road cycle including driving a test vehicle equipped with a particulate filter for a road cycle time, wherein the particulate filter has a filter inlet and a filter bed; collecting a plurality of measurements of filter inlet temperature versus road cycle time and of a filter bed temperature versus road cycle time; selecting aging test conditions by determining a total aging time needed to achieve a thermal aging target based on a plurality of measurements; selecting an aging temperature and selecting an aging time at the aging temperature to achieve a thermal aging target; and calculating a predicted total ash loading ($AL_{total}$) over the in-service lifetime of the particulate filter.

The following definitions of terms are provided to clarify the meanings of certain terms as used herein.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1

A Standard road cycle (SRC) test was conducted in a gasoline direct injection engine (SAIC MG GS) powered vehicle equipped with a cordierite catalyzed GPF filter for 40 minutes. Temperature profiles were collected for the emissions control system and were measured at the inlet and the bed locations of the GPF. The temperature profile is shown in FIG. 1. The vehicle speed is recorded in the lowest line. The GPF inlet temperature is recorded in the middle line. The GPF bed temperature is recorded in the upper line.

To determine the thermal aging target, the BAT equation used to generate an Arrhenius plot for the inlet temperature and bed temperature measurements. In this example, A=1.1 and R=17,500. $T_h$ is the time measured within the prescribed temperature bin of the vehicles catalyst temperature histogram adjusted to a full useful life basis. $T_r$ is the effective reference temperature (in Kelvin, K) of the catalyst on the catalyst bench run on the bench aging cycle. $T_y$ is the mid-point temperature (in Kelvin, K) of the temperature bin of the vehicle on-road catalyst temperature histogram. FIG. 2 depicts the Arrhenius plot generated from the temperature data collected during the SRC. For the bench aging test to be completed in about 100 hours, the bench aging test must be conducted at a GPF inlet temperature above about 620° C. (lower curve) or at a bench temperature above about 670° C. (upper curve) to achieve an equivalent thermal load during the advanced aging test.

The bench aging test was then conducted with a 2.0 L direct injection gasoline engine equipped with a cordierite-coated GPF. The accelerated aging profile was conducted according to Table 2.

TABLE 2

Accelerated aging profile for exemplary bench aging test

|  | Unit | Mode 1 | Mode 2 | Mode 3 |
|---|---|---|---|---|
| Speed | rpm | 3500 | 3000 | 2000 |
| Torque | N*m | 121.1 | 236 | 69.5 |
| Power | kW | 44.4 | 74.1 | 14.6 |
| Fuel flow | kg/hr | 11.95 | 18.47 | 4.21 |
| Exhaust Temperature | ° C. | 742 | 819 | 550 |
| PN | #/cm³ | 3.38E+6 | 5.59E+6 | 4.14E+7 |
| FSN |  | 0.03 | 0.07 | 0.25 |
| Oil doping |  | Yes | Yes | No |

Mode 1 was operated for $t_1$=1.5 hrs; Mode 2 was operated for $t_2$=0.5 h; Mode 3 was operated for $t_3$=1 hr; and Mode 4 was operated under (conditions) for $t_4$=0.5 h at $T_4$=600° C. During the bench aging test, data were collected for fuel consumption, exhaust temperature, Particle Number (PN), and filter smoke number (FSN). Engine maps were generated as shown in FIGS. 3-6.

The dopant used was a lubricant formulation according to Table 3. The dopant was present in the fuel in an amount of 1 wt. %.

TABLE 3

Properties of lubricant formulation dopant

| Properties | Unit | Results |
|---|---|---|
| Kv40 | mm²/s | 71.96 |
| Kv100 | mm²/s | 12.13 |
| CCS-30 | mPa•s | 5900 |
| TBN |  | 6.76 |
| SAP |  | 0.87 |
| MRV (-35°) |  | 26852 |
| ICP |  |  |
| B | ppm | 50 |
| CA | ppm | 2120 |
| MG | ppm | 19 |
| MO | ppm | 112 |
| P | ppm | 803 |
| ZN | ppm | 889 |

Predicted total particle number emissions ($PN_{total}$) was calculated according to the equation given above, and was determined to be $9.1 \times 10^{11}$ particles per km, which is within acceptable guidelines. Predicted ash loading ($AL_{total}$) was calculated according to the equations given above, and was determined to be 32 g/L. Port-mortem dissection of the GPF found an actual ash loading of 24 g/L.

Thus, in this example, the methods disclosed herein were used to predict that particle emissions would be within acceptable limits at 125,000 miles with a 170 hour accelerated aging test.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing examples are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A method of predicting performance of an emissions control system comprising a particulate filter over an in-service lifetime, comprising:
   conducting an aging test comprising operating an engine having an emissions control system including a particulate filter through an aging profile, wherein the engine is operated for an aging time and at an aging temperature;
   wherein predicting the performance of the emissions control system includes measuring the weight gain of the particulate filter after the aging test;
   wherein the aging profile comprises multiple cycles and wherein each cycle comprises a first mode operated for a first time ($t_1$), a second mode operated for a second time ($t_2$), and a third mode operated for third time ($t_3$); and
   wherein at least one mode is performed using a doped fuel.

2. The method of claim 1, wherein each of $t_1$, $t_2$, and $t_3$ is about 0.25 hours to about 2 hours.

3. The method of claim 1, further comprising calculating the predicted total ash loading ($AL_{total}$) using an ash loading equation:

$$AL_{total} = FC_{total} * m\% * CR\%$$

wherein m % is a weight percent of a dopant in a fuel, and CR % is a percent ash collection rate in the emissions control system.

4. The method of claim 1, wherein the aging time is less than about 300 hours.

5. The method of claim 1, wherein the emissions control system comprises at least one of a selective reduction catalyst (SCR), a lean NOx trap (LNT), a catalytic converter, and a muffler.

6. The method of claim 1, wherein the particulate filter is a gasoline particulate filter.

7. The method of claim 1, wherein a subset of the multiple cycles comprises a fourth mode that is a soot regeneration mode.

8. The method of claim 7, wherein the soot regeneration mode has a duration of about 5 minutes to about 30 minutes at intervals of about 10 hours to about 20 hours during the aging time.

9. A method of predicting performance of an emissions control system comprising a particulate filter over an in-service lifetime, comprising:
   conducting an aging test comprising operating an engine having an emissions control system including a particulate filter through an aging profile, wherein the engine is operated for an aging time and at an aging temperature;
   wherein predicting the performance of the emissions control system includes measuring the weight gain of the particulate filter after the aging test; and
   wherein the aging time and the aging temperature are determined by:
   conducting a road cycle comprising driving a test vehicle wherein the emissions control system is equipped with a particulate filter for a road cycle time, wherein the particulate filter comprises a filter inlet and a filter bed;
   collecting a plurality of measurements of a filter inlet temperature versus road cycle time and of a filter bed temperature versus road cycle time; and
   selecting the aging time and selecting the aging temperature to achieve a thermal aging target.

10. The method of claim 9, further comprising generating an engine map based on the plurality of measurements.

11. The method of claim 9, wherein the road cycle time is less than about 2 hours.

* * * * *